(12) United States Patent
Günther (10) Patent No.: US 11,454,524 B2
(45) Date of Patent: Sep. 27, 2022

(54) MEASUREMENT APPARATUS AND MEASUREMENT METHOD

(71) Applicant: Rohde & Schwarz GmbH & Co. KG, Munich (DE)

(72) Inventor: Thomas Günther, Waldenburg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 306 days.

(21) Appl. No.: 16/030,519

(22) Filed: Jul. 9, 2018

(65) Prior Publication Data

US 2020/0011714 A1  Jan. 9, 2020

(51) Int. Cl.
*G01D 9/00* (2006.01)

(52) U.S. Cl.
CPC .................. *G01D 9/005* (2013.01)

(58) Field of Classification Search
CPC ........ G01D 9/005; G01R 13/02; G01R 13/28; G01R 13/0272; G01R 13/029; G01R 1/073
See application file for complete search history.

(56) References Cited

U.S. PATENT DOCUMENTS

| | | | | |
|---|---|---|---|---|
| 5,926,777 A * | 7/1999 | Vink | ............... | G01D 9/005 702/130 |
| 6,327,544 B1 * | 12/2001 | Samuels | .......... | G01R 31/31912 345/501 |
| 7,008,387 B2 * | 3/2006 | Saruwarati | ........... | A61B 5/1118 600/595 |
| 8,374,811 B2 | 2/2013 | Sullivan et al. | | |
| 9,192,768 B2 * | 11/2015 | Yokoi | ................ | A61N 1/36034 |
| 9,405,914 B2 * | 8/2016 | Amorim | ............... | G06F 21/577 |
| 10,466,285 B2 * | 11/2019 | Schamber | .............. | G01D 4/002 |
| 10,495,676 B2 * | 12/2019 | Mondot | ................ | G01D 9/005 |
| 2007/0282542 A1 * | 12/2007 | Duff | .................... | G01R 13/0254 702/35 |
| 2009/0043803 A1 * | 2/2009 | Frishberg | .............. | G06F 16/904 |
| 2010/0056886 A1 * | 3/2010 | Hurtubise | ............. | A61B 5/1455 600/324 |
| 2010/0145905 A1 * | 6/2010 | Sepielli | .................... | G06F 16/29 707/609 |
| 2011/0137594 A1 | 6/2011 | Sullivan et al. | | |
| 2012/0290576 A1 * | 11/2012 | Amorim | ............... | G06F 16/258 707/E17.046 |

(Continued)

FOREIGN PATENT DOCUMENTS

EP    2330429 A2    6/2011

OTHER PUBLICATIONS

U.S. Appl. No. 15/794,361, filed Oct. 26, 2017, 16 pages.

*Primary Examiner* — Douglas Kay
(74) *Attorney, Agent, or Firm* — Westman, Champlin & Koehler, P.A.

(57) ABSTRACT

The present invention relates to a measurement apparatus and method. In particular, the present invention performs a data acquisition of data segments upon a predetermined condition is met. In order to analyze the acquired measurement data, it is further suggested to store information specifying the condition which has been met when acquiring the acquired data segment. Accordingly, a user can easily identify the condition which has caused the data acquisition of a data segment when analyzing the acquired measurement data.

20 Claims, 3 Drawing Sheets

(56) References Cited

U.S. PATENT DOCUMENTS

| | | | | |
|---|---|---|---|---|
| 2013/0218238 A1* | 8/2013 | Yokoi | .................... | A61B 5/375 607/62 |
| 2014/0309956 A1* | 10/2014 | Mondot | ................ | G01D 4/002 702/61 |
| 2016/0103163 A1* | 4/2016 | Schamber | .............. | G01D 9/005 702/61 |
| 2017/0060114 A1* | 3/2017 | Barford | ................ | G05B 19/045 |
| 2017/0285072 A1* | 10/2017 | Wu | ...................... | G01R 13/029 |

* cited by examiner

MEASUREMENT APPARATUS AND MEASUREMENT METHOD

TECHNICAL FIELD

The present invention relates to a measurement apparatus. The present invention further relates to a measurement method.

BACKGROUND

The amount of data captured by measuring devices has significantly increased in recent years. With increased bandwidth and sample size of the measurement devices, huge amount of data have to be handled. In a typical test, a data acquisition of a measurement signal may be triggered based on a predetermined trigger condition. Upon the predetermined trigger condition is met, a data acquisition is started and the acquired data may be provided to a user. Multiple trigger conditions may be defined for starting a data acquisition procedure.

When evaluating the acquired measurements, a user has to analyze the acquired measurement data. In this task, the user wants to know which trigger event might have initiated the data acquisition of the related measurement data. In case there are multiple different predetermined trigger conditions for acquiring measurement data, it might be rather difficult for a user to identify the correct trigger condition which has initiated the data acquisition. Thus, identifying a related trigger condition might be a difficult and time-consuming task.

Against this background, the problem addressed by the present invention is to put the user in a position to easily recognize a condition which has led to an acquisition of a measurement signal. In particular, the present invention aims to provide a simple and clear indication for providing information which has caused a data acquisition of a measurement signal.

SUMMARY

The present invention solves this problem with a measurement apparatus and a measurement method with the features of the independent claims. Further advantageous embodiments are subject matter of the dependent claims.

According to a first aspect of the invention, a measurement apparatus is provided. The measurement apparatus comprises a measurement interface, a measurement acquisition device, a measurement memory and a supplementary data memory. The measurement interface is adapted to receive a measurement signal. The measurement acquisition device is adapted to acquire a number of one or more data segments of the received measurement signal. In particular, the measurement acquisition device is adapted to acquire a data segment upon a first data acquisition condition is met. The first data acquisition condition may be any one out of a number of predetermined data acquisition conditions. The measurement memory is adapted to store the acquired number of data segments. The supplementary data memory is adapted to store information related to the first acquisition condition which is met when the number of data segments of the received measurement signal is acquired.

According to a second aspect, a measurement method is provided. The measurement method comprises a step of receiving a measurement signal. The measurement signal may be received by measurement interface. The measurement method further comprises acquiring a number of data segments of the received measurement signal. The data segments may be acquired by a measurement acquisition device. In particular, the data segments may be acquired upon a first data acquisition condition is met. The first data acquisition condition comprises at least one data acquisition condition out of a number of predetermined data acquisition conditions. The method further comprises storing the acquired number of data segments in a measurement memory, and storing information related to the acquisition condition which is met when a data segment of the received measurement signal is acquired. In particular, the related information may be stored in a supplementary data memory.

The present invention is based on the fact that a data acquisition of a related measurement signal may be started upon a predetermined condition, e.g. a trigger condition, is met. In particular, it may be possible to define a plurality of conditions for starting a data acquisition of a measurement signal. If there are many different conditions which may cause starting a data acquisition of a measurement signal, it may be rather difficult for a user to identify the correct condition which has triggered a data acquisition. Manually identifying the correct condition may be very difficult and time-consuming.

Thus, it is an idea of the present invention to store further supplementary information related to the acquired data of a measurement signal. In particular, the supplementary information related to the acquired data of a measurement signal may comprise information for specifying the condition which has been met in order to trigger the data acquisition. Thus, the supplementary information related to the acquired measurement data may be provided to the user in combination with the acquired measurement data, and the user can easily recognize the condition which has caused the data acquisition of the acquired measurement data. In this way, the analysis of the acquired measurement data can be improved.

The measurement interface of the measurement apparatus may be any kind of appropriate interface for receiving a measurement signal. The received measurement signal may be further provided to the measurement acquisition device. The measurement interface may receive any kind of measurement signal. In particular, the measurement signal may be an analogue or digital signal. In case the measurement signal is an analogue signal, the measurement interface may convert the received analogue signal to a digital signal. For this purpose, the measurement interface may comprise an analogue-to-digital converter. In particular, the analogue signal may be converted to a digital signal based on a predetermined sampling rate and/or a predetermined resolution, e.g. 8 bits, 16 bits, 24 bits, 32 bits. Furthermore, the measurement interface may also comprise further elements like resistors, capacitors, inductors, filters, etc. In particular, the measurement interface may comprise hardware elements for adapting the impedance of an input port to a predetermined impedance. The measurement interface may comprise a connector for connecting a cable or directly connecting a device under test. Furthermore, the measurement interface may also receive an analogue signal and forward the received analogue signal to the measurement acquisition device. In this case, an analogue-to-digital conversion may be performed by the measurement acquisition device. In particular, the analogue-to-digital conversion may be performed by the measurement acquisition device in a same manner as already described above in connection with the measurement interface.

The measurement acquisition device may be coupled with the measurement interface and receive an output of the measurement interface. For example, the measurement acquisition device may receive digital data relating to an analogue or digital signal received by the measurement interface. As already mentioned above, the measurement acquisition device may also receive an analogue signal according to an analogue signal received by the measurement interface, and the measurement acquisition device may convert the received analogue signal to a digital signal by an analogue-to-digital converter.

The measurement acquisition device may monitor the signal received from the measurement interface. In particular, the measurement acquisition device may monitor the received signal from the measurement interface in order to identify a property in the received signal which matches a specified data acquisition condition. The data acquisition condition may be specified in advance. In particular, the data acquisition condition may be a condition out of a number of one or more predetermined conditions. The data acquisition conditions may specify conditions relating to a property of the received signal. In particular, if one of the conditions specified in the data acquisition condition is met, the data acquisition device starts a data acquisition of the received signal. For this purpose, the measurement acquisition device stores digital data related to the received signal in the measurement memory. As already mentioned above, the digital data related to the measurement signal may be obtained by converting an analogue signal to a digital signal or by directly receiving a digital measurement signal. In particular, the measurement acquisition device stores a data segment related to the received measurement signal. Such a data segment may comprise digital data relating to a predetermined time period, a predetermined amount of data, a predetermined number of samples, or an amount of data limited by another predetermined condition.

The measurement acquisition device may perform a data acquisition of a data segment each time a data acquisition condition is met. Accordingly, the measurement acquisition device may acquire multiple data segments and store each acquired data segment in the measurement memory. For example, the operation of the measurement acquisition device may be started and/or stopped manually. However, it may be also possible that the measurement acquisition device may perform its operation until a predetermined stop condition is met. For example, the measurement acquisition device may perform an acquisition of data segments for a predetermined number of data segments, for a predetermined time period or until a predetermined stop condition is met in the received measurement signal. However, any other condition for starting and/or stopping the data acquisition may be also possible.

Further to the data segments stored in the measurement memory, additional information related to the condition for acquiring a data segment by the measurement acquisition device may be stored. In particular, the additional information may be stored in the supplementary data memory of the measurement apparatus. For this purpose, each time the data segment is acquired by the measurement acquisition device due to a data acquisition condition, the related condition which is met may be stored in the supplementary data memory. In particular, an information for specifying the condition which is met may be stored in the supplementary data memory. Furthermore, an information specifying a relationship between the data stored in the measurement memory and the related data stored in the supplementary data memory may be also stored in association with the data stored in the measurement memory and/or the data stored in the supplementary data memory. In this way, it may be possible to determine the specific condition which has been met for causing a data acquisition of a data segment. The other way around, it may be also possible to identify one or more data segments which has been acquired in response to a specific data acquisition condition.

The measurement acquisition device may be realized, for example, by a processor, in particular a signal processor. The signal processor may comprise, for example, a general purpose processor with corresponding instructions. The signal processor may comprise interfacing elements that are coupled to the measurement interface. The interfacing elements may comprise, for example, analogue-to-digital converter that convert an analogue signal from the measurement interface to a digital signal that may be processed by the processor. In particular, a dedicated analogue-to-digital converter may be coupled to the processor via a serial or parallel digital interface. The measurement acquisition device may further comprise analogue elements like filters, capacitors, inductors or resistors or the like.

The processor of the measurement acquisition device may comprise hardware elements like a processing unit. However, the measurement acquisition device may be also software-implemented at least in part. Instructions may therefore be stored in a further memory that is coupled to a general purpose processor, e.g. via a memory bus. The processor may further execute an operating system that loads and executes instructions. The processor may be, for example, an Intel processor that runs a Windows or Linux operating system that loads and executes the instructions. Alternatively, the processor may be processor that run an embedded operating system that loads and executes the instructions.

The measurement memory and/or the supplementary data memory may be any kind of appropriate memory. For example, the measurement memory and/or the supplementary data memory may be volatile or nonvolatile memories. In particular, the measurement memory and the supplementary data memory may be realized by a common memory chip or alternatively by separate memory chips.

Further embodiments of the present invention are subject of the further sub-claims and the following description referring to the drawings.

In a possible embodiment, the predetermined data acquisition conditions comprise at least one trigger condition and/or at least one timer condition.

In this context, a trigger condition may be considered as an occurrence of a certain property in the measurement signal. For example, a trigger condition may be a rising edge or a falling edge in the measurement signal. Furthermore, a trigger condition may be also, for example, an event when the measurement signal exceeds a predetermined threshold value or falls below a predetermined threshold value. Furthermore, a trigger condition may be also an event when the measurement signal maintains a specific condition for a predetermined time period. However, it is understood that any other kind of condition of the measurement signal may be also specified as a trigger condition for starting a data acquisition. Furthermore, the data acquisition may be also started based on a timer condition. For example, a data acquisition may be started if no trigger event has been identified for a predetermined time period. Furthermore, it may be also possible to start a data acquisition based on a periodic timer event. For example, a data acquisition may be periodically started based on predetermined time intervals. However, it is understood that any other kind of timer event may be also used for starting a data acquisition.

In a possible embodiment, the information related to the data acquisition condition which is stored in the supplementary data memory comprise timestamp information.

The timestamp information may comprise, for example, time information relating to the point of time when the data acquisition condition is met. For example, the timestamp information may be based on a real-time clock. In an alternative example, the timestamp information may comprise a value of a counter. However, any other kind of timestamp information for identifying the point of time when the data acquisition condition is met may be also possible.

In a possible embodiment, the measurement apparatus may comprise an input device. The input device may be adapted to receive information for specifying the data acquisition condition, i.e. the condition for starting a data acquisition.

The input device may be, for example, a user interface for receiving a user input specifying a data acquisition condition. In particular, a user may select a number of one or more data acquisition conditions out of a plurality of predetermined data acquisition conditions. Alternatively, a user may input one or more parameters for specifying a data acquisition condition. Alternatively, the data acquisition conditions may be also received, for example, by a digital interface, wherein the digital interface may be connected to a further processing device. In this way, the data acquisition conditions may be automatically obtained via the interface.

In a possible embodiment, the measurement apparatus may comprise an output device. The output device may be adapted to output at least one of the acquired data segments stored in the measurement memory. The output device may further output information of the related acquisition condition stored in the supplementary data memory. In particular, the information of the related acquisition condition may be output in association with the related data segment.

The acquired data segment and the related information of the acquisition condition may be output, for example, on a display. For this purpose, the measurement apparatus may comprise such a display, in particular a monochrome or a color display. For example, the display may be a TFT display or the like. In an example, the display may be a computer screen or the like. In an alternative example, the display may be a display of an oscilloscope or another measurement device.

For example, the acquired data segment may be displayed as a curve. Furthermore, the information of the related data acquisition condition may be provided as a pointer, e.g. an arrow, pointing to the data acquisition event in the acquired data segment. Furthermore, the data acquisition condition may be indicated by changing the color, thickness, or another property of a signal curve of the acquired data segment. Furthermore, the related information of the acquisition condition may be also output by a box comprising alphanumeric signs or the like.

In a possible embodiment, the measurement apparatus may comprise a filter device. The filter device may be adapted to identify a number of one or more data segments stored in the measurement memory. In particular, the identified data segments may relate to information stored in the supplementary data memory which fulfill a predefined condition.

Accordingly, relevant information may be searched in the data stored in the supplementary data memory for any kind of information. For example, the data segments stored in the measurement memory may be grouped based on the information stored in the supplementary data memory. Accordingly, all data segments relating to a number of one or more specific data acquisition conditions may be identified based on the data stored in the supplementary data memory. In this way, all data segments relating to one or more specific data acquisition conditions can be easily identified and output.

In a possible embodiment, the measurement apparatus may comprise a signaling device. The signaling device may be adapted to output a predetermined signaling upon a predefined second data acquisition condition is met.

The signaling may comprise any kind of signaling, for example an optical, acoustical or electronic signaling.

The second data acquisition condition may correspond to the first data acquisition condition. However, it may be also possible that the second data acquisition condition is different from the first data acquisition condition.

The signaling may be provided to a user. Additionally or alternatively, a signaling may be also provided to another device. In this way, the other device may receive the signaling and perform one or more specific operations upon receiving the signaling. For example, the further device may read out the data stored in the measurement memory and/or the supplementary data memory for a further analysis. However, it is understood that any other kind of operation may be also initiated based on the signaling.

In a possible embodiment, the measurement apparatus may comprise a signal generator. The signal generator may be adapted to generate a predetermined signal. In particular, the predetermined signal may be generated upon a third predetermined data acquisition condition is met.

The third predetermined data acquisition condition may be the same as the first data acquisition condition. However, in some instances the third data acquisition condition may be different from the first data acquisition condition.

The signal generated by the signal generator may be any kind of signal. For example, the signal may be a direct current signal, a pulse or a signal having a predetermined frequency. For example, the generated signal may be provided to a device under test which is measured by the measurement apparatus and which provides the measurement signal received by the measurement interface.

In a possible embodiment, the measurement interface of the measurement apparatus is adapted to continuously receive the measurement signal. Furthermore, the measurement acquisition device may be adapted to acquire a data segment comprising data relating to the measurement of the signal which has been received before the first data acquisition condition is met.

In a possible embodiment, the measurement acquisition device only acquires data relating to the measurement signal in a time before the first data acquisition condition is met. In another embodiment, the measurement acquisition device may acquire data relating to a time period before the first data acquisition condition is met and data relating to a time period after the data acquisition condition is met. Furthermore, the measurement acquisition device may also acquire only data relating to a period of time after the first data acquisition condition is met.

In order to acquire data of the measurement signal relating to the point of time before the data acquisition condition is met, the measurement apparatus may comprise a memory for continuously storing data of the measurement signal. For example, this memory may be a cyclic memory for continuously storing data of the measurement signal relating to a predetermined period of time.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

Figure 1:
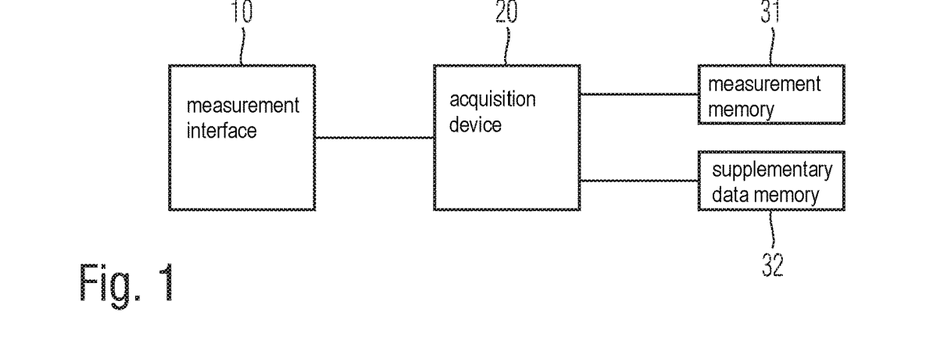
FIG. 1 shows a block diagram of an embodiment of a measurement apparatus according to the present invention.

FIG. 1 shows a block diagram of a measurement apparatus 1. The measurement apparatus 1 comprises a measurement interface 10, a measurement acquisition device 20, a measurement memory 31 and a supplementary data memory 32. Measurement interface 10 may receive a measurement signal. For example, measurement interface 10 may receive a measurement signal from a device under test. For this purpose, measurement interface 10 may comprise a connector for electrically coupling the measurement interface 10 with the device under test. The device under test may be directly connected to the measurement interface 10, or by means on an additional cable. Alternatively, it may be also possible that measurement interface 10 may be connected with an antenna for receiving a wireless signal from a device under test. It is understood that any other possibility for receiving a measurement signal by measurement interface 10 may be also possible.

Measurement interface 10 may receive any kind of measurement signal. For example, measurement interface 10 may receive a digital signal. Alternatively, measurement interface 10 may also receive an analogue signal, for instance a radio frequency signal. However, any other analogue signal may be also possible. Measurement interface 10 may comprise analogue elements such as capacitors, inductors or resistors. Furthermore, measurement interface 10 may also comprise components such as a filter, an amplifier, an attenuator, a mixer or the like. Any other kind of components, in particular any kind of analogue elements may be also possible. Furthermore, measurement interface 10 may comprise an analogue-to-digital converter for converting a received analogue measurement signal into a digital signal. In particular, the analogue signal may be converted based on a predetermined sampling rate and/or a predetermined resolution. The sampling rate and/or the resolution may be adapted depending on the desired measurement circumstances. Measurement interface 10 may forward the received measurement signal to the measurement acquisition device 20. In case measurement interface 10 receives a digital signal, the digital signal may be directly forwarded to measurement acquisition device 20. If measurement interface 10 receives an analogue signal, measurement interface 10 may convert the received analogue signal to a digital signal and forward the digital signal to the measurement acquisition device 20. In an alternative embodiment, it may be also possible that a measurement interface 10 receives an analogue signal and forwards the analogue signal to measurement acquisition device 20. In this case, measurement acquisition device 20 may perform an analogue-to-digital conversion. In particular, the analogue-to-digital conversion may be performed by an analogue-to-digital converter as already described above in connection with the measurement interface 10.

Measurement acquisition device 20 is connected to measurement interface 10 and receives an analogue or digital signal related to the measurement signal received by measurement device 10. Measurement interface 10 may amplify, attenuate, filter and/or digitalize the received measurement signal before forwarding the signal to the measurement acquisition device 20. Furthermore, measurement acquisition device 20 analyzes the received signal in order to detect a predetermined data acquisition condition. Such a data acquisition condition may be, for example, a trigger condition and/or a timer condition. A trigger condition may be, for example, a specified condition of the signal received by the data acquisition device 20 from the measurement interface 10. For example, the trigger condition may be a rising or falling edge of the received signal. Furthermore, the trigger condition could be also a value of the received signal above or below a predetermined threshold value, a condition specifying that the received signal maintains a predetermined value for a specified time period or any other specification of a parameter related to the received signal. Furthermore, a trigger condition may also comprise a predetermined sequence of multiple conditions which have to be fulfilled in a predefined order. For example, a number of two or more conditions may be defined which have to be fulfilled in a specified order in order to meet a trigger condition.

A timer condition may be any kind of condition related to a time period or a specified point of time. For example, a timer condition may be fulfilled if no defined trigger condition has been met for a specified period of time. Another example of a timer condition may be, for example, specifying a number of one or more points of time. Another example of a timer condition may be, for example defining a time interval of frequency for a periodical timing. However, any other condition related to time periods or points of time may be also possible.

Accordingly, there exists a number of one or more data acquisition conditions comprising at least one trigger condition and/or at least one timer condition. Measurement acquisition device 20 may receive a signal from measurement interface 10 and perform a data acquisition upon at least one of the predetermined data acquisition conditions is met. In particular, measurement acquisition device 20 may acquire a data segment of the received signal upon a data acquisition condition is met. A data segment may relate to a predefined sequence of the received signal. For example, a data segment may comprise a predetermined number of measurement samples, a data segment may relate to a predefined period of time, in particular a predefined period of time which may be adapted depending on the sampling rate, or any other parameter for specifying a length or an amount of data of a data segment.

Measurement acquisition device 20 may acquire a data segment each time a data acquisition condition is met. In particular, the acquisition of data segments by the measurement acquisition device may be started and/or terminated based on a manual user input, an external trigger signal or a predetermined condition of the received signal. However, any other condition for starting or terminating the data acquisition may be also possible.

Measurement acquisition device 20 may be further connected with the measurement memory 31 and the supplementary data memory 32. Measurement acquisition device 20 may store the acquired data segments in the measurement memory 31. Further to this, the data acquisition condition which has been met when the measurement acquisition device 20 acquires a data segment is stored in the supplementary data memory 32. For this purpose, any kind of data format for storing information specifying the related data acquisition condition may be used. For example, each data acquisition condition may be associated with a specific number and the specific number may be stored in supplementary data memory 32. Furthermore, the information for specifying the related data acquisition condition further comprises an indication for specifying the corresponding data segment which has been acquired by the measurement acquisition device 20 in response to that the respective data acquisition condition is met. Accordingly, based on the information stored in supplementary data memory 32, it is possible to determine the data acquisition condition which has been met when acquiring the data segment stored in measurement memory 31. Furthermore, any other kind of information may be also stored together with the information of the related acquisition condition in supplementary data memory 32. For example, a timestamp may be also stored together with the information of the related acquisition condition in supplementary data memory 32. The timestamp may comprise a point of time specified by a clock, for example a real-time clock, a number of a counter which is continuously increased, or any other kind of timing information for specifying a point of time when the data segment is acquired. It is understood, that any other kind of information related to the data acquisition may be also stored in association with the information of the data acquisition condition.

Figure 2:
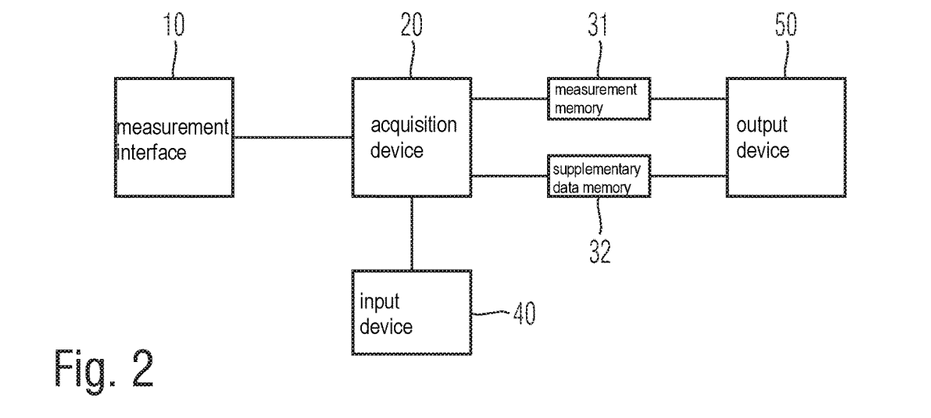
FIG. 2 shows a block diagram of another embodiment of a measurement apparatus according to the present invention.

FIG. 2 shows a further embodiment of a measurement apparatus 1. The measurement apparatus 1 according to FIG. 2 mainly corresponds to the previously described measurement apparatus 1 according to FIG. 1. The measurement apparatus 1 according to FIG. 2 further comprises an input device 40. The input device 40 may be, for example a user interface for receiving a user input. Accordingly, a user may input any kind of data. In particular, a user may input a number of one or more data acquisition conditions. Accordingly, a user may specify the data acquisition conditions which have to be met in order to perform a data acquisition of a data segment. For example, a user may input any kind of parameter for characterizing a data acquisition condition, in particular a trigger condition. Furthermore, input device 40 may provide a plurality of data acquisition conditions, and a user may select a number of one or more of the provided data acquisition conditions. For example, the input interface 40 may provide the possible data acquisition conditions on a screen, for example a touch screen or the like. Additionally or alternatively, input device 40 may comprise an interface, for example a digital interface, which may be connected with a further device for automatically receiving information such as specifications of data acquisition conditions. It is understood that any other kind of input device 40 for receiving data acquisition conditions and/or parameters characterizing data acquisition conditions may be also possible.

Additionally or alternatively, measurement apparatus 1 may further comprise an output device 50. Output device 50 may be, for example a display such as a computer screen. Accordingly, output device 50 may read one or more of the data segments stored in measurement memory 31 and provide a representation of the respective data segment, for example on a screen. In particular, the data segment may be provided on the output device 50 in form of a signal curve or the like. Furthermore, output device 50 may read the information stored in supplementary data memory 32 in order to determine the data acquisition condition which has been met when acquiring the respective data segment. Based on the information read from supplementary data memory 32, output device 50 may further provide an appropriate indication in order to show the data acquisition condition in the representation of the data segment.

Figure 3:
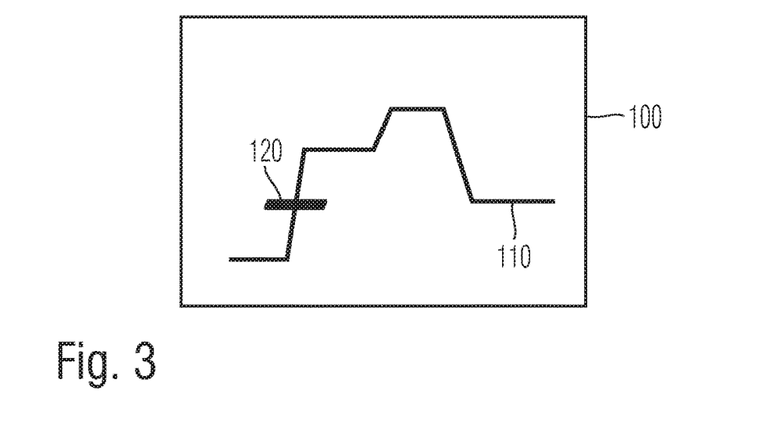
FIG. 3 shows a schematic illustration of a representation of acquired data according to an embodiment.

FIG. 3 shows a schematic illustration 100 for displaying a data segment 110. Furthermore, an indication 120 is provided for illustrating the data acquisition condition which has been met for initiating the data acquisition of the data segment. In this example, the additional information for specifying the data acquisition condition is shown by a bar. However, any other kind of representation for indicating the data acquisition condition may be also possible. For example, the respective segment of the data segment may be displayed in another color, by changing the type of the line, by displaying an arrow or the like or by providing a textbox comprising alphanumeric signs.

Figure 4:
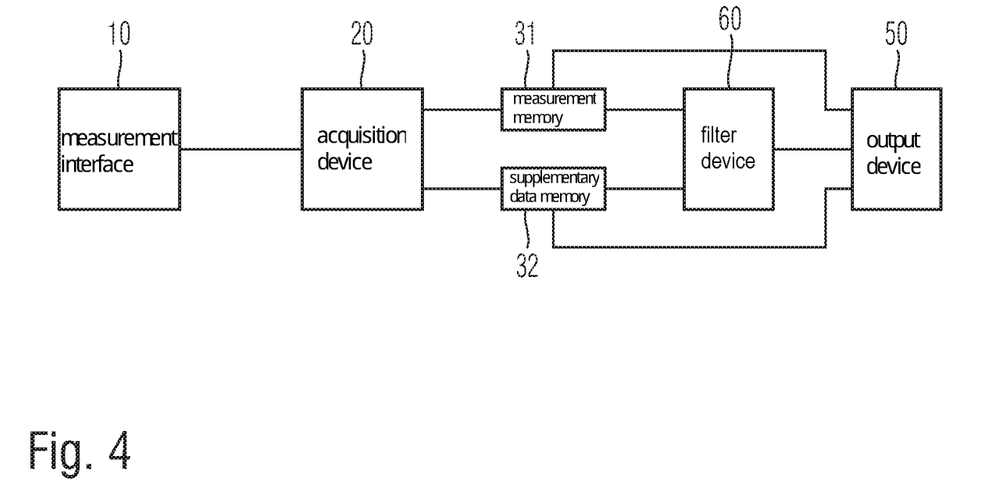
FIG. 4 shows a block diagram of another embodiment of a measurement apparatus according to the present invention.

FIG. 4 shows a block diagram of a measurement apparatus 1 according to a further embodiment. The measurement apparatus 1 according to FIG. 4 mainly corresponds to the previously described measurement apparatuses. Measurement apparatus 1 according to FIG. 4 further comprises a filter device 60 which may be also connected to measurement memory 31 and supplementary data memory 32. Filter device 60 may perform an analysis of the information stored in supplementary data memory 32 in order to identify a number or one or more entries in supplementary data memory 32 which fulfill a number of one or more specific conditions. In this way, filter device 60 may identify, for example, all entries relating to a specific data acquisition condition. Accordingly, when identifying all entries relating to a specific data acquisition condition, it may be further possible to determine the related data segments. In this way, it may be possible to output all data segments relating to one or more specific data acquisition conditions. The identified data segments and/or the respective information stored in the supplementary data memory 32 may be output to a further processing device (not shown) or may be provided to a user by means of output device 50.

Figure 5:
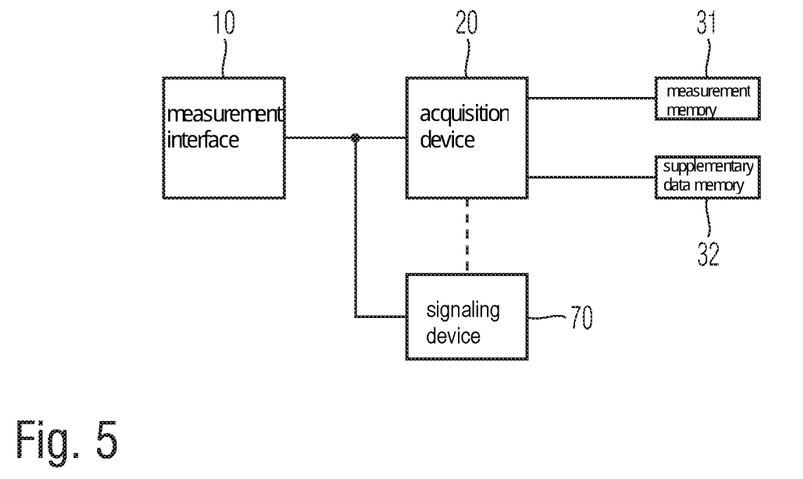
FIG. 5 shows a block diagram of still another embodiment of a measurement apparatus according to the present invention.

FIG. 5 shows a further embodiment of a measurement apparatus 1. Measurement apparatus 1 in FIG. 5 mainly corresponds to the previously described measurement apparatuses 1. Measurement apparatus 1 according to FIG. 5 further comprises a signaling device. Signaling device 70 may analyze the received signal provided by measurement interface 10 in order to identify a data acquisition condition out of a number of one or more predetermined data acquisition conditions. The data acquisition conditions may correspond to the data acquisition conditions for causing a data acquisition by measurement acquisition device 20. However, it may be also possible that the acquisition conditions of signaling device 70 may be different from the data acquisition conditions of measurement acquisition device 20. Furthermore, it may be also possible that acquisition device 20 may forward an indication to signaling device 70 in order to indicate that a predetermined data acquisition condition is met.

Upon detecting a specific data acquisition condition by signaling device 70 and/or receiving an indication of a fulfilled data acquisition condition from measurement acquisition device 20, signaling device 70 may output a signaling. The signaling may be, for example an optical, acoustical or electronic signaling. In this way, a user may be provided with an indication that a respective data acquisition condition is met. Furthermore, an electronic signaling may be provided to a further device in order to initiate a predetermined operation.

Additionally or alternatively, measurement apparatus 1 may comprise a signal generator for generating a predetermined analogue or digital signal. The predetermined signal may comprise, for example, a direct current signal, a signal of a predetermined frequency, or any other kind of signal. For example, the generated signal may be provided to a device under test. In particular, the generated signal may be generated upon a predetermined condition, for example a condition such as a data acquisition condition is met. For this purpose, the signal generator may analyze the signal provided by measurement interface 10 in order to identify a respective condition. Additionally or alternatively, the signal generator may receive an indication from data acquisition device 20 upon a data acquisition condition is met.

Data acquisition device 20, input device 40, output device 50, filter device 60, signaling device 70 and/or the signal generator may be realized, for example by means of a number of one or more processing units comprising a processor. Furthermore, the processing devices may comprise a memory for storing instructions causing the processor to perform respective operation. However, it is understood, that the devices may be also realized in any other appropriate manner.

For sake of clarity in the following description of the method based on FIG. 6 reference signs above used in the description of apparatus based on FIGS. 1, 2, 4 and 5 will be maintained.

Figure 6:
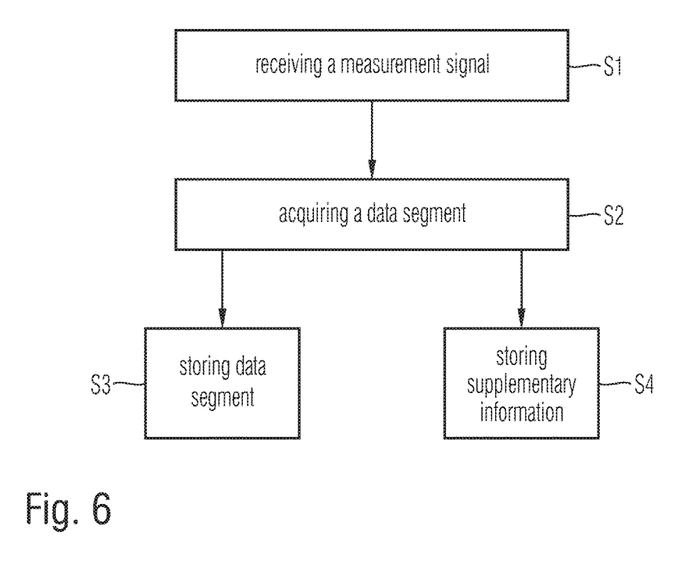
FIG. 6 shows a block diagram of an embodiment of a measurement method according to the present invention.

FIG. 6 shows a block diagram of measurement method according to an embodiment.

The measurement method comprises a step S1 for receiving a measurement signal. The measurement signal may be received by a measurement interface 10. The method further comprises a step S2 of acquiring a number of data segments of the received measurement signal upon a first data acquisition condition is met. The acquiring may be performed by a measurement acquisition device 20. The first data acquisition condition may comprise at least one data acquisition condition of a number of predetermined data acquisition conditions. Further, the method comprises a step S3 for storing the acquired number of data segments in a measurement memory; and a step S4 for storing information related to the acquisition condition which is met when the number of data segments of the received measurement signal is acquired. The related information may be stored in a supplementary data memory 32.

In the method, the predetermined data acquisition conditions may comprise at least one trigger condition and/or at least one timer condition.

The information related to the data acquisition condition which is stored in the supplementary data memory 32 comprise a timestamp information.

The method may further comprise receiving, by an input device, information for specifying the first data acquisition condition.

The method may further comprise outputting, by an output device, at least one of the acquired data segments stored in the measurement memory in association with the information of the related acquisition condition stored in the supplementary data memory.

The method may further comprise identifying, by a filter device, data segments stored in the measurement memory, wherein the identified data segments are related to information stored in the supplementary data memory fulfilling a predefined condition.

The method may further comprise outputting, by a signaling device, a predetermined signaling upon a predefined second data acquisition condition is met. The signaling may comprises an optical, acoustical or electronic signaling.

The method may further comprise generating, by a signal generator, a predetermined signal, upon a third predetermined data acquisition condition is met.

The receiving the measurement signal may comprises continuously receiving the measurement signal. The acquisition of a number of data segments acquires a data segment may comprise data relating to the measurement of the signal which has been received before the first data acquisition condition is met.

Summarizing, the present invention relates to a measurement apparatus and method. In particular, the present invention performs a data acquisition of data segments upon a predetermined condition is met. In order to analyze the acquired measurement data, it is further suggested to store information specifying the condition which has been met when acquiring the acquired data segment. Accordingly, a user may easily identify the condition which has caused the data acquisition of a data segment when analyzing the acquired measurement data.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish

The invention claimed is:

1. A measurement apparatus, comprising:
   a measurement interface adapted to receive a measurement signal;
   a measurement acquisition device coupled to a measurement device and adapted to analyze a signal received from the measurement interface to identify any one of a data acquisition condition for starting a data acquisition of the measurement signal out of multiple predetermined data acquisition conditions in the signal received from the measurement interface, and to acquire a number of data segments of the received measurement signal upon the identified data acquisition condition out of the multiple predetermined data acquisition conditions is met;
   a measurement memory adapted to store the acquired number of data segments; and
   a supplementary data memory adapted to store acquisition condition information specifying the acquisition condition out of the multiple predetermined data acquisition conditions, which is met for causing the data acquisition when the number of data segments of the received measurement signal is acquired,
   wherein each time when one of the data segments is acquired by the measurement acquisition device due to a data acquisition condition out of the number of multiple predetermined data acquisition conditions, the acquisition condition information related to the acquisition condition which is met is stored in the supplementary data memory, and
   wherein relationship information specifying a relationship between the data stored in the measurement memory and the acquisition condition information related to the acquisition condition stored in the supplementary data memory is stored in association with the data stored in the measurement memory or the information stored in the supplementary data memory,
   wherein the relationship information specifying the relationship between the data stored in the measurement memory and the acquisition condition information related to the acquisition condition makes it possible to determine the acquisition condition out of the multiple predetermined data acquisition conditions which has been met for causing the data acquisition of a data segment and/or to identify one or more data segments which have been acquired in response to a specific data acquisition condition out of the multiple predetermined data acquisition conditions
   wherein the stored acquisition condition information specifying the acquisition condition out of the multiple predetermined data acquisition conditions, which is met for causing the data acquisition when the number of data segments of the received measurement signal is acquired allows a user to identify the condition of the acquired data during post analysis.

2. The measurement apparatus according to claim 1, wherein the multiple predetermined data acquisition conditions comprise at least one trigger condition and/or at least one timer condition.

3. The measurement apparatus according to claim 1, wherein the acquisition condition information related to the data acquisition condition which is stored in the supplementary data memory comprise a timestamp information.

4. The measurement apparatus according to claim 1, comprising an input device adapted to receive acquisition condition information for specifying the data acquisition condition.

5. The measurement apparatus according to claim 1, comprising an output device adapted to output at least one of the acquired data segments stored in the measurement memory in association with the acquisition condition information of the related acquisition condition stored in the supplementary data memory.

6. The measurement apparatus according to claim 1, comprising a filter device adapted to identify data segments stored in the measurement memory, wherein the identified data segments are related to information stored in the supplementary data memory fulfilling a predefined condition.

7. The measurement apparatus according to claim 1, comprising a signaling device adapted to output a predetermined signaling upon a predefined further data acquisition condition is met.

8. The measurement apparatus according to claim 7, wherein the signaling comprises an optical, acoustical or electronic signaling.

9. The measurement apparatus according to claim 1, comprising a signal generator adapted to generate a predetermined signal, upon a third predetermined data acquisition condition is met.

10. The measurement apparatus according to claim 1, wherein the measurement interface is adapted to continuously receive the measurement signal; and
    the measurement acquisition device is adapted to acquire a data segment comprising data relating to the measurement of the signal which has been received before the data acquisition condition out of the multiple predetermined data acquisitions is met.

11. A measurement method, comprising:
    receiving a measurement signal by a measurement interface;
    analyzing a signal received from the measurement interface to identify any one of a data acquisition condition for starting a data acquisition of the measurement signal out of the multiple predetermined data acquisition in the signal received from the measurement interface;
    acquiring, by a measurement acquisition device, a number of data segments of the received measurement signal upon the identified data acquisition condition out of the multiple predetermined data acquisition is met,
    storing the acquired number of data segments in a measurement memory; and
    storing, in a supplementary data memory, acquisition condition information specifying the acquisition condition out of the number of the multiple predetermined data acquisition conditions, which is met for causing the data acquisition when the number of data segments of the received measurement signal is acquired, wherein each time when one of the data segments is acquired due to a data acquisition condition out of the number of multiple predetermined data acquisition conditions, the acquisition condition information related to the acquisition condition which is met is stored in the supplementary data memory, and wherein relationship information specifying a relationship between the data stored in the measurement memory and the acquisition condition information related to the acquisition condition stored in the supplementary data memory is stored in association with the data stored in the measurement memory or the information stored in the supplementary data memory, wherein the relationship information specifying the relationship between the data stored in the measurement memory and the acquisition condition information related to the acquisition condition makes it possible to determine the acquisition condition which has been met for causing the data acquisition of a data segment and/or to identify one or more data segments which have been acquired in response to a specific data acquisition condition wherein the stored acquisition condition information specifying the acquisition condition out of the multiple predetermined data acquisition conditions, which is met for causing the data acquisition when the number of data segments of the received measurement signal is acquired allows a user to identify the condition of the acquired data during post analysis.

12. The measurement method according to claim 11, wherein the multiple predetermined data acquisition conditions comprise at least one trigger condition and/or at least one timer condition.

13. The measurement method according to claim 11, wherein the acquisition condition information related to the data acquisition condition which is stored in the supplementary data memory comprise a timestamp information.

14. The measurement method according to claim 11, comprising receiving, by an input device, acquisition condition information for specifying the data acquisition condition.

15. The measurement method according to claim 11, comprising outputting, by an output device, at least one of the acquired data segments stored in the measurement memory in association with the acquisition condition information of the related acquisition condition stored in the supplementary data memory.

16. The measurement method according to claim 11, comprising identifying, by a filter device, data segments stored in the measurement memory, wherein the identified data segments are related to information stored in the supplementary data memory fulfilling a predefined condition.

17. The measurement method according to claim 11, comprising outputting, by a signaling device, a predetermined signaling upon a predefined further data acquisition condition is met.

18. The measurement method according to claim 17, wherein the signaling comprises an optical, acoustical or electronic signaling.

19. The measurement method according to claim 11, comprising generating, by a signal generator, a predetermined signal, upon a third predetermined data acquisition condition is met.

20. The measurement method according to claim 11, wherein the receiving the measurement signal comprises continuously receiving the measurement signal; and wherein the acquisition of a number of data segments acquires a data segment comprising data relating to the measurement of the signal which has been received before the data acquisition condition out of the multiple predetermined data acquisition conditions is met.

* * * * *